United States Patent
Woods et al.

(10) Patent No.: US 6,698,268 B2
(45) Date of Patent: Mar. 2, 2004

(54) PASSIVE-ADAPTIVE INDENTOR FOR STRESS WAVE COLD WORKING

(75) Inventors: Mark A. Woods, Renton, WA (US); Jeffrey A. Wilkerson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 10/100,808

(22) Filed: Mar. 18, 2002

(65) Prior Publication Data

US 2003/0172706 A1 Sep. 18, 2003

(51) Int. Cl.[7] .......................... B21D 28/26; B21D 31/00
(52) U.S. Cl. .............................. 72/412; 72/377; 72/334
(58) Field of Search ........................... 72/325, 334, 327, 72/412, 377

(56) References Cited

U.S. PATENT DOCUMENTS

| | | |
|---|---|---|
| 2,810,191 A | 10/1957 | Hanna |
| 3,110,086 A * | 11/1963 | Phillips ................. 29/897.1 |
| 3,434,327 A | 3/1969 | Speakman |
| 3,748,948 A * | 7/1973 | Schmitt ................. 411/378 |
| 3,796,086 A * | 3/1974 | Phillips ................. 72/377 |
| 3,824,824 A | 7/1974 | Leftheris |
| 3,895,922 A * | 7/1975 | Phillips ................. 428/596 |
| 4,493,141 A * | 1/1985 | Krezak ................. 29/509 |
| 4,711,115 A | 12/1987 | Sukonnik et al. |
| 6,230,537 B1 | 5/2001 | Easterbrook |
| 6,389,865 B1 * | 5/2002 | Easterbrook ......... 72/334 |
| 2001/0052254 A1 | 12/2001 | Easterbrook et al. |
| 2002/0011091 A1 | 1/2002 | Easterbrook |

FOREIGN PATENT DOCUMENTS

| | | | |
|---|---|---|---|
| FR | 2308440 | * 11/1976 | ............. 72/334 |
| SU | 1808878 | * 4/1993 | ............. 72/334 |
| WO | WO 93/09890 | 5/1993 | |
| WO | WO 01/58617 | 8/2001 | |
| WO | WO 01/58617 A1 | 8/2001 | |

OTHER PUBLICATIONS

International Search Report, Aug. 22, 2003.
Kiryanov, A M et al., Database WPI, Section Ch, Week 199425, Derwent Publications Ltd., London, GB; XP002251035 & SU 1 808878A, MOSC Mikoyan Mech Eng Wks), Apr. 15, 1993, abstract.

* cited by examiner

Primary Examiner—Daniel C. Crane
(74) Attorney, Agent, or Firm—Shimokaji Fritz LLP

(57) ABSTRACT

A passive-adaptive indentor is provided for cold working a material that includes a material surface and a depth extending in a direction that is perpendicular to a direction of the material surface. The passive-adaptive indentor has a first member that includes a first working end that is configured to create a first residual stress field that extends to a predetermined depth in the material. The passive-adaptive indentor also has a second member that includes a second working end that is configured to create a second residual stress field that extends to a generally fixed second depth of the material regardless of the depth to which the first residual stress field extends. A method of using a passive-adaptive indentor for cold working a material is also presented.

31 Claims, 7 Drawing Sheets

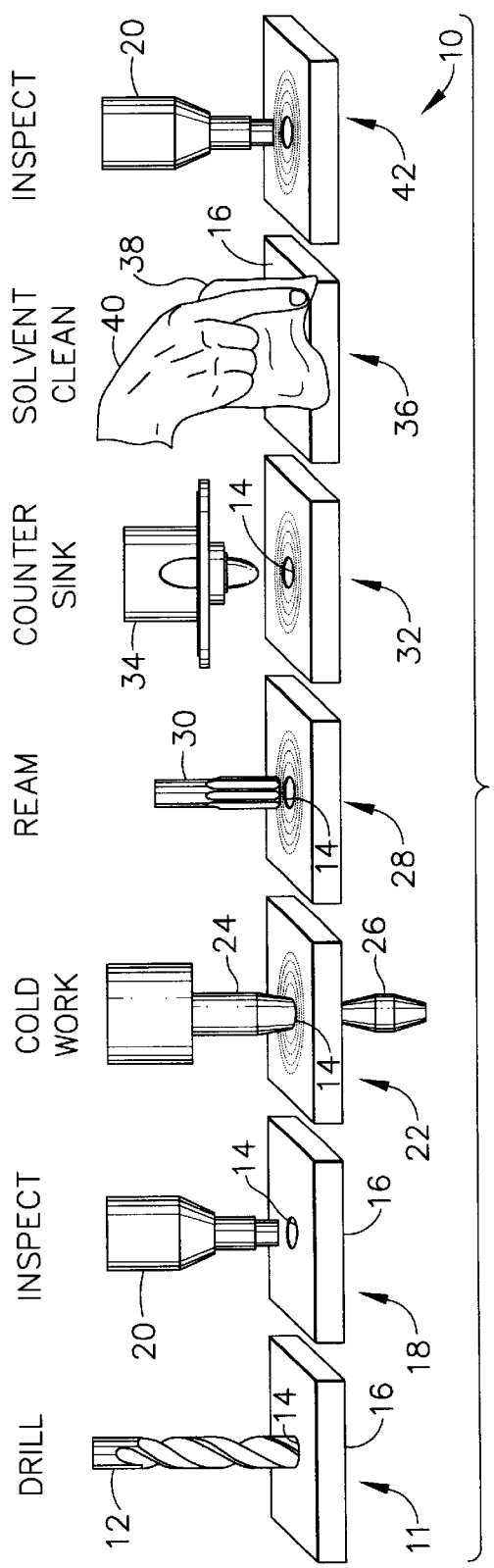
FIG. 1 (PRIOR ART)
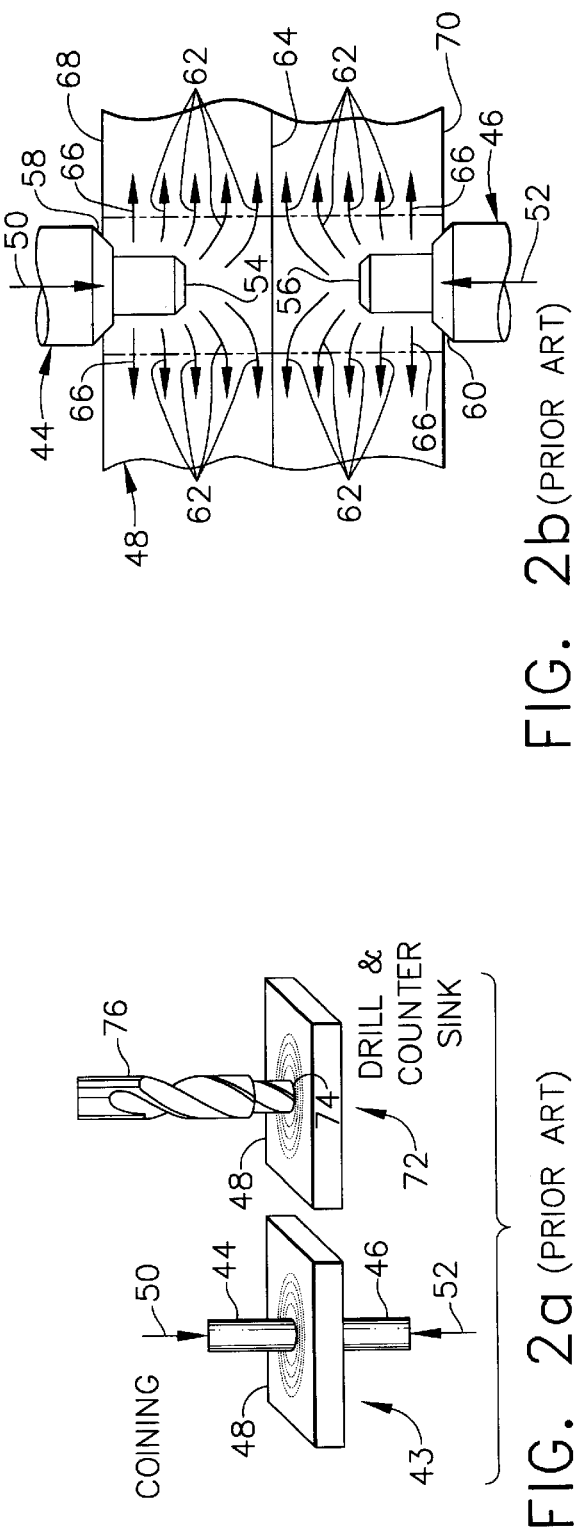
FIG. 2b (PRIOR ART)
FIG. 2a (PRIOR ART)

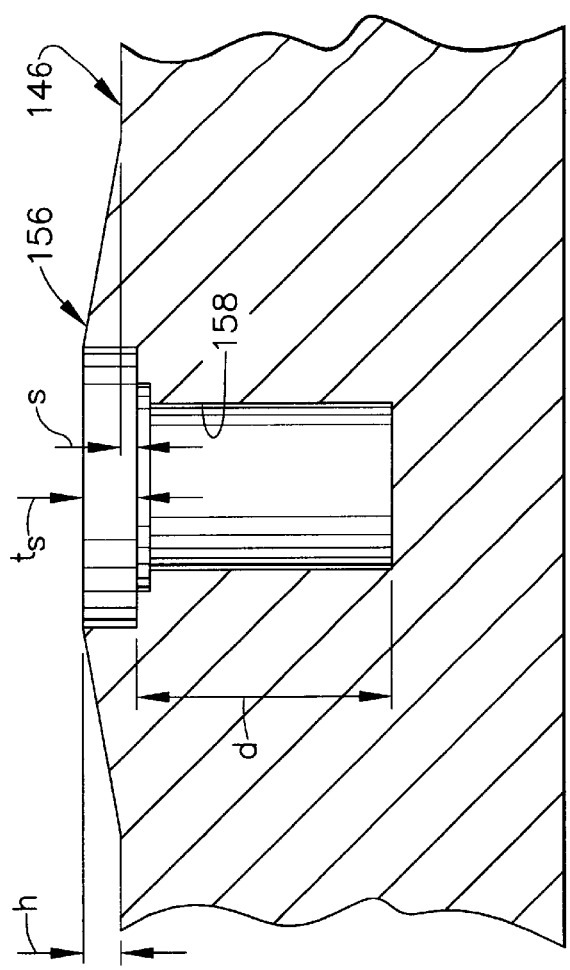
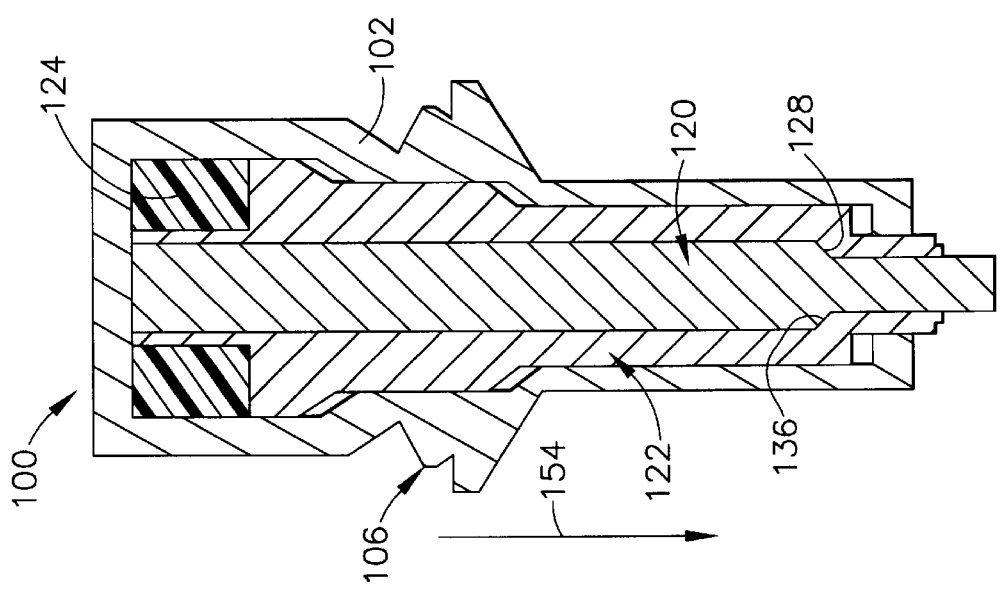
FIG. 4c
FIG. 5

PASSIVE-ADAPTIVE INDENTOR FOR STRESS WAVE COLD WORKING

BACKGROUND OF THE INVENTION

The present invention relates to an apparatus and a method for cold working a material and, more particularly, to an apparatus and a method for cold working a material by separately applying various forces to the material in a single application.

In aerospace structures, materials such as structural members including spars, stringers, ribs and an outer skin, e.g., aluminum sheeting or planar material, may be joined together by the use of fasteners. For example, a stringer having an engaging or faying surface may be juxtaposed with a corresponding faying surface of a planar material. Thereafter, holes or apertures may be drilled into the materials and fasteners, such as rivets, inserted into the apertures to form a fastened joint.

The fastened joints are potentially subject to failure from fatigue by the formation of fissures or cracks in the materials after substantial use. In airplanes, for example, cyclical pressurization and depressurization during each flight causes various stress cycles on the fuselage skin. These stress cycles likely contribute to a formation of cracks, which typically start at the apertures in the material where fasteners join the airplane skin to the skeleton or rib structure of the airplane. This is because, e.g., varying loads caused by pressurization changes that are carried by the skin must be routed around the periphery of the apertures.

During assembly of the skin of an airplane, such as along the fuselage and along the wing structure, it is well known to first cold work the apertures prior to assembly with a fastener in order to create a residual compressive stress about the periphery of the aperture. The residual compressive stress functions to counteract a loading that generally includes, in the case of fuselage pressurization changes, tensile strain variations. In this way, the useful life of the fuselage skin is greatly enhanced.

Current cold working methods require completion of a substantial number of steps. For example, a prior art method for cold working a material (which may include a joint) is diagrammatically shown at 10 in FIG. 1. In a first drill step 11, a drill 12 is used to create an aperture 14 in a material 16 to be cold worked. In a subsequent inspect step 18, an inspection device 20 may be employed to inspect the aperture 14 to determine if the diameter is within tolerance. Thereafter, in a cold work step 22, a mandrel 24 having a diameter that is about 3% larger than that of the aperture 14 is forced through the aperture 14 from one side of the material 16. Accordingly, the aperture 14 is thereby expanded which compresses the material surrounding the aperture 14 so as to create a residual stress field in the material 16 surrounding the aperture 14. In a ream step 28, the aperture 14 may be bored to a proper size for receiving a fastener (not shown) using a ream 30. In a counter sink step 32, the aperture 14 is counter sunk with a bit 34 to recess a head of a fastener (not shown). Thereafter, in a cleaning step 36, a solvent may be used by a mechanic 40 to remove lubricating oil from the cold work step, prior to another inspection step 42 using the inspection device 20.

Recently, it has been proposed that the material located, e.g., at a joint, be compressed or coined, prior to creating an aperture, so as to create a residual stress field which extends within a material to be fastened. One example of such a two step method is shown in FIG. 2a where in a coining step 43, a pair of indentors 44 and 46 are urged under a force in the direction of arrows 50, 52 into contact with a material 48.

As shown in greater detail in FIG. 2b, the indentors 44 and 46 each include a blunt end 54, 56 and a shoulder 58, 60 in fixed relationship. The blunt ends 54, 56 function to create a residual stress field, represented by arrows 62, which extends deep within the material 48 to a joint 64. The shoulders 58, 60 function to create a larger diametrical residual stress field, represented by arrows 66, but which extends generally closely to surfaces 68, 70 of the material 48. The use of shoulders 58, 60 is to overcome the tensile stress created at the part surface by the blunt ends 54, 56. The depth and configuration of the residual stress field is dependent on, e.g., the force applied to the indentors 44, 46 and a length between the blunt ends 54, 56 and the shoulders 58, 60. Generally, it is desired that the residual stress field created by the shoulders 58, 60 remain near the surface of the material while the stress field created by the blunt ends 54, 56 extend to the joint 64.

Thereafter and referring again to FIG. 2a, in a drill and counter sink step 72, an aperture 74 is created by a drill and a counter sink bit 76.

While suitable for its intended purpose, a problem arises in that the apparatus and the method illustrated in FIGS. 2a and 2b requires employing a different indentor with a different configuration depending on the desired depth and configurations of the residual stress fields. This is particularly cumbersome in the manufacture of airplanes as there are numerous joints to be fastened, most of which, vary in depth from the skin.

Accordingly, there is a need for an improved apparatus and method for cold working that does not require the changing of the indentors depending on depth of the joint.

SUMMARY OF THE INVENTION

According to one aspect of the present invention, a passive-adaptive indentor is provided for cold working a material that includes a material surface and a depth extending in a direction that is perpendicular to a direction of the material surface. The passive-adaptive indentor comprises a first member that includes a first working end that is configured to create a first residual stress field that extends to a predetermined depth in the material. The indentor also comprises a second member that includes a second working end that is configured to create a second residual stress field that extends to a generally fixed second depth of the material regardless of the depth to which the first residual stress field extends.

In another aspect of the invention, a passive-adaptive indentor is provided for cold working a material that includes a material surface and a depth extending in a direction that is perpendicular to a direction of the material surface. The passive-adaptive indentor comprises a first member that has a first working end that is configured to create a first residual stress field and which extends to a predetermined depth in the material. The first member is subjected to a first force whereby the first working end strikes the material surface at a force sufficient to create the first residual stress field. A second member is disposed in slidable relationship with the first member and comprises a second working end. The second member is configured to create a second residual stress field that extends to a generally fixed second depth of the material regardless of the depth at which the first residual stress field extends. The second member also is subjected to a second force whereby the second working end strikes the material surface at a force sufficient to create the second residual stress field.

In a further aspect of the invention, a passive-adaptive indentor is provided for cold working a material that includes an aerospace structure. The aerospace structure includes a planar material having a planar material faying surface, a support material having a support material faying surface and a joint located at a contact portion of the planar material faying surface and the support material faying surface. The planar material includes a planar material surface and a depth extending in a direction that is perpendicular to a direction of the planar material surface. The passive-adaptive indentor comprises a first member that is configured to create a first residual stress field in the material that extends to the joint. The first member may be subjected to a first force whereby the first working end strikes the planar material surface at a force sufficient to create the first residual stress field and the first member may comprise a shaft terminating in a first working end which comprises an end surface. The indentor may also comprise a second member that is subjected to a second force whereby the second working end strikes the planar material surface at a force sufficient to create a second residual stress field that extends to a depth that is substantially less than that of the first residual stress field. The second member may comprise a tubular structure that terminates in a second working end that comprises a shoulder surface. The tubular structure may be dimensioned and configured to be in a co-axial relationship with the shaft and to be movable along an axial direction of the shaft. The tubular structure may also comprise a collar and a radially extending portion. The indentor may further comprise a housing having a cavity defined by an inner surface and an opening and the housing is in fixed relationship with the shaft which extends within the cavity and through the opening. The tubular structure also extends through the opening. The indentor may still further comprise a compressible spring material which comprises an elastomer that is disposed between the inner surface of the cavity and a surface of the radially extending portion of the tubular structure.

In still a further aspect of the invention, a method of cold working a material using a passive-adaptive indentor to create plural stress fields in the material is provided. The indentor is capable of varying a depth at which a first stress field is to extend while a second stress field extends to a fixed depth in the material. The material includes a material surface, a depth extending in a direction that is perpendicular to a direction of the material surface and the method comprises the steps of: providing a material having multiple locations to be cold worked; identifying a first location and a particular depth of interest to which a first stress field is to extend at the first location; identifying a particular force to apply to a passive-adaptive indentor depending upon the particular depth of interest; applying the particular force to the first passive-adaptive indentor to simultaneously create a first residual stress field that extends to the particular depth of interest and a second residual stress field that extends to a generally fixed depth of the material regardless of the depth to which the first residual stress field extends; and moving the passive-adaptive indentor to another location.

These and other features, aspects and advantages of the present invention will become better understood with reference to the following drawings, description and claims.

BRIEF DESCRIPTION OF THE DRAWINGS

FIG. 1 is a diagram showing a series of steps of a prior art method and apparatus for cold working a material;

FIG. 2a is a diagram showing a series of steps of another prior art method and apparatus for cold working a material;

FIG. 2b is an enlarged view of a pair of indentors used in the method and apparatus of FIG. 2a;

FIG. 4c is a view similar to FIG. 4 showing the tubular structure of the passive-adaptive indentor completely retracted;

FIG. 5 is a cross-sectional view of a portion of the material to be cold worked showing a dimple received from the passive-adaptive indentor of FIG. 3;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

An improved cold working apparatus and method is provided by the present invention that is capable of creating a first residual stress field that extends to various joint depths depending on the force applied to the apparatus while contemporaneously creating a second residual stress field. The second residual stress field generally extends only to a fixed depth that is substantially less than the depth of the first residual stress field. Accordingly, the present invention provides a significant advantage by eliminating the required change in indentors because of the variance in joint depth between locations to be cold worked.

Figure 3:
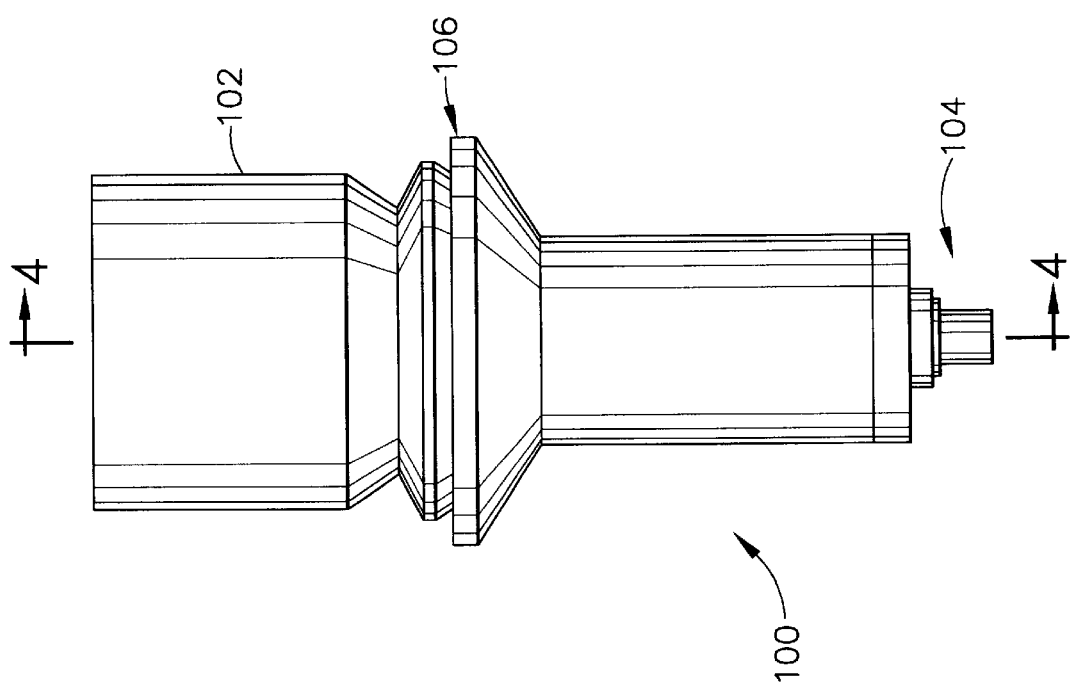
FIG. 3 is a front elevational view of a passive-adaptive indentor in accordance with one embodiment of the present invention.

A passive-adaptive indentor is shown generally at 100 in FIG. 3 in accordance with an embodiment of the present invention. The passive-adaptive indentor 100 may comprise a housing 102 and an output end 104. The housing 102 may be generally cylindrical in outer configuration and be composed of any suitably strong and durable material capable of withstanding compression forces ranging well above 24,000 pounds (24 Kps) such as a hardened steel. The housing 102 may also comprise a mounting structure 106 which may be received by a correspondingly configured receiving structure (not shown) of, e.g., a numerically controlled manufacturing machine (below referred to as an "NC machine").

Figure 4:
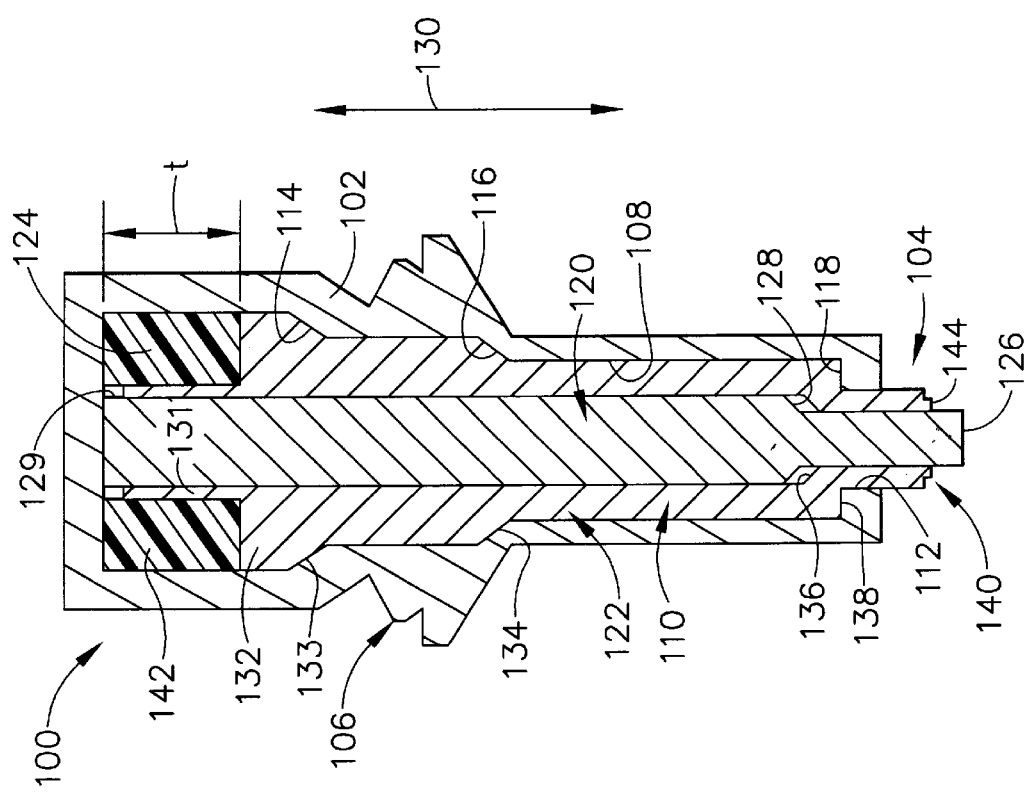
FIG. 4 is a cross-sectional view taken along line IV of FIG. 3.

Referring now to FIG. 4 which shows a cross section of the passive-adaptive indentor 100 where it can be seen that the housing 102 may also comprise an interior surface 108 which defines a cavity 110 and an opening 112. The interior surface 108 may comprise a series of stop portions 114, 116 and 118 the function of which is described below.

The passive-adaptive indentor 100 also may comprise a first member or a shaft 120 a second member or tubular structure 122 and a spring material 124. The shaft 120 may be fixed, e.g., via a fastener (not shown) or welding, within the cavity 110 adjacent interior surface 108 of the housing 102. However, it will be understood that any other suitable arrangement whereby the shaft 120 is in fixed relationship with the housing 102 may be employed.

The shaft 120 also may be composed of a hardened steel that is capable of withstanding forces as described above and comprises a first working end or end surface 126 and a stop surface 128. The end surface 126 is illustrated as generally flat, although, it will be appreciated that any suitable configuration may be employed which may create a suitably shaped residual stress field which extends to a desired joint depth as described below.

The tubular structure 122 may also be composed of a hardened steel and is illustrated as being mounted co-axially with the shaft 120. The tubular structure may be mounted such that it may slide along an outer surface 129 with the shaft 120 and, during use, reciprocates along the direction of arrow 130. The tubular structure 120 may comprise a collar 131, an increased radial portion 132, engagement portions 133, 134, 136, and 138, and a second working end or shoulder portion 140.

The collar 131 and increased radial portion 132 together with the interior surface 108 may define a ring-like space 142 for the receipt of the spring material 124, described below. The engagement portions 133, 134 and 138 are configured to engage the stop portions 114, 116 and 118, for retaining the tubular structure within the housing 102. Engagement portion 136 may be configured to engage the stop surface 128 of the shaft 120 during reciprocal movement of the tubular structure 122, described below.

The shoulder portion 140 is illustrated as comprising a surface portion 144 that is stepped, although, it will be appreciated that any suitably configured surface including a generally flat surface may be employed. It will be appreciated that, during use, the shoulder portion 140 causes compression of a larger diameter area of a material, described below, where the head of a fastener (not shown) is located.

The spring material 124 may be located between the interior surface 108 of the housing 102 and the increased radial portion 132 of the tubular structure 122. The spring material 124 may be composed of a polymeric or elastomeric substance which is capable of undergoing a compressive strain of roughly 10% of the spring material 124 thickness. Preferably, the spring material 124 may be capable of undergoing a compressive strain that is up to about 15% elastic deformation of its thickness. A thickness t (FIG. 4) of 1.00 inch is preferred, although, the spring material 124 may range between 0.75 inch and 1.5 inches in thickness. One material that has been found to function suitably is a urethane, No. SG MP950 that is 0.75 inch thick and sold by Harkness Industries Inc. of (Cheshire), Conn. It will be appreciated that other materials, such as a coil spring or a compressible fluid, which provide suitable rebound and elastic deformation may also be employed in the practice of this invention.

The operation of this embodiment of the present invention is described with reference to FIGS. 4–4c. FIG. 4 illustrates a relaxed condition of the passive-adaptive indentor 100 wherein the tubular structure 122 is fully extended.

Figure 4B:
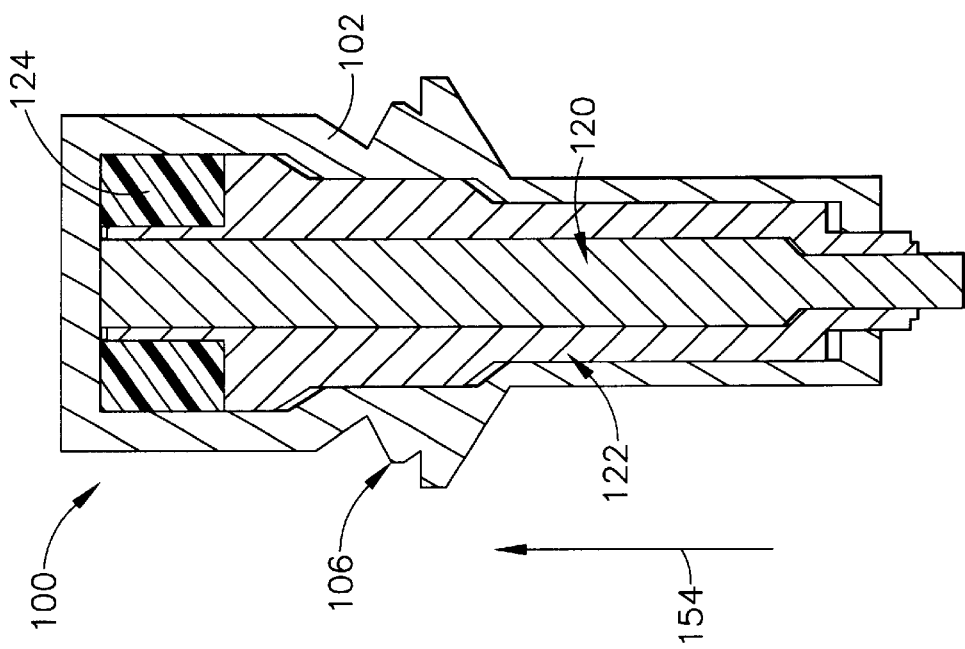
FIG. 4b is a view similar to FIG. 4 showing the tubular structure of the passive-adaptive indentor more fully retracted.
Figure 4A:
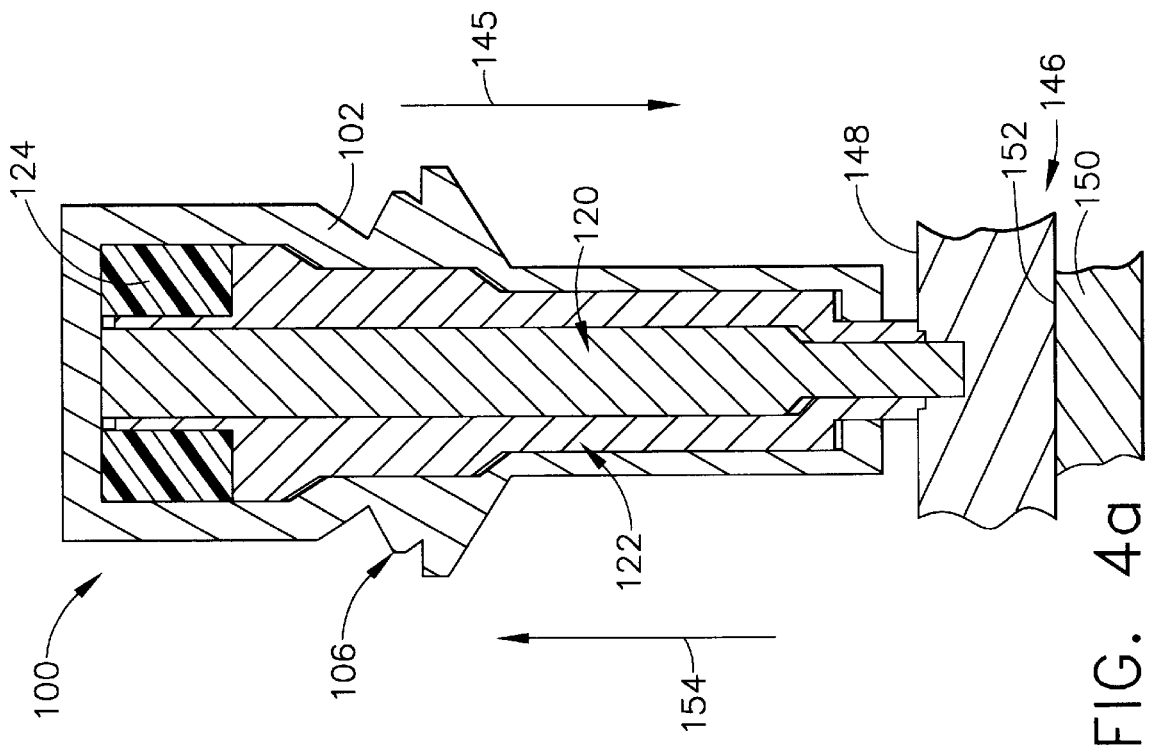
FIG. 4a is a view similar to FIG. 4 showing a tubular structure of the passive-adaptive indentor in a partially retracted position upon contact with a material to be cold worked.

FIG. 4a illustrates a condition of the passive-adaptive indentor 100 after having been forced, in the direction of arrow 145 by a suitable device such as an NC machine, into contact with a material 146 to be cold worked, such as a portion of an airplane. In particular, the material 146 may comprise a planar material 148 which, e.g., forms the "skin" of an airplane along with a structural support member such as a rib or stringer 150 that is to be fastened together with the planar material at a joint 152. It will be appreciated that the shaft 120 extends into the planar material 148 a depth that is exaggerated for clarity. As can be seen, the tubular structure 122 has been retracted and the spring material 124 has been compressed somewhat in the direction of an arrow 154 thereby reducing the force applied to the tubular structure as compared with that applied to the shaft 120. It will also be understood that a second passive-adaptive indentor (not shown) similar to the passive-adaptive indentor 100 may be located on an opposing side of the material 146 for providing additional residual stress fields in the material.

Intermediate and fully retracted conditions of the passive-adaptive indentor 100 are illustrated in FIGS. 4b and 4c, wherein the tubular structure 122 moves in the direction of the arrow 154 to a position, shown in FIG. 4c wherein the engagement portion 136 of the tubular structure 122 is in contact with the stop surface 128 of the shaft 120. A dimpling of the material 146 results as is shown in FIG. 5. In particular, a volcano 156 having a height h may be created along with a dimple 158 having a stepped configuration and defining a true shoulder depth ts, a shoulder depth s and a dimple depth d.

Figure 6:
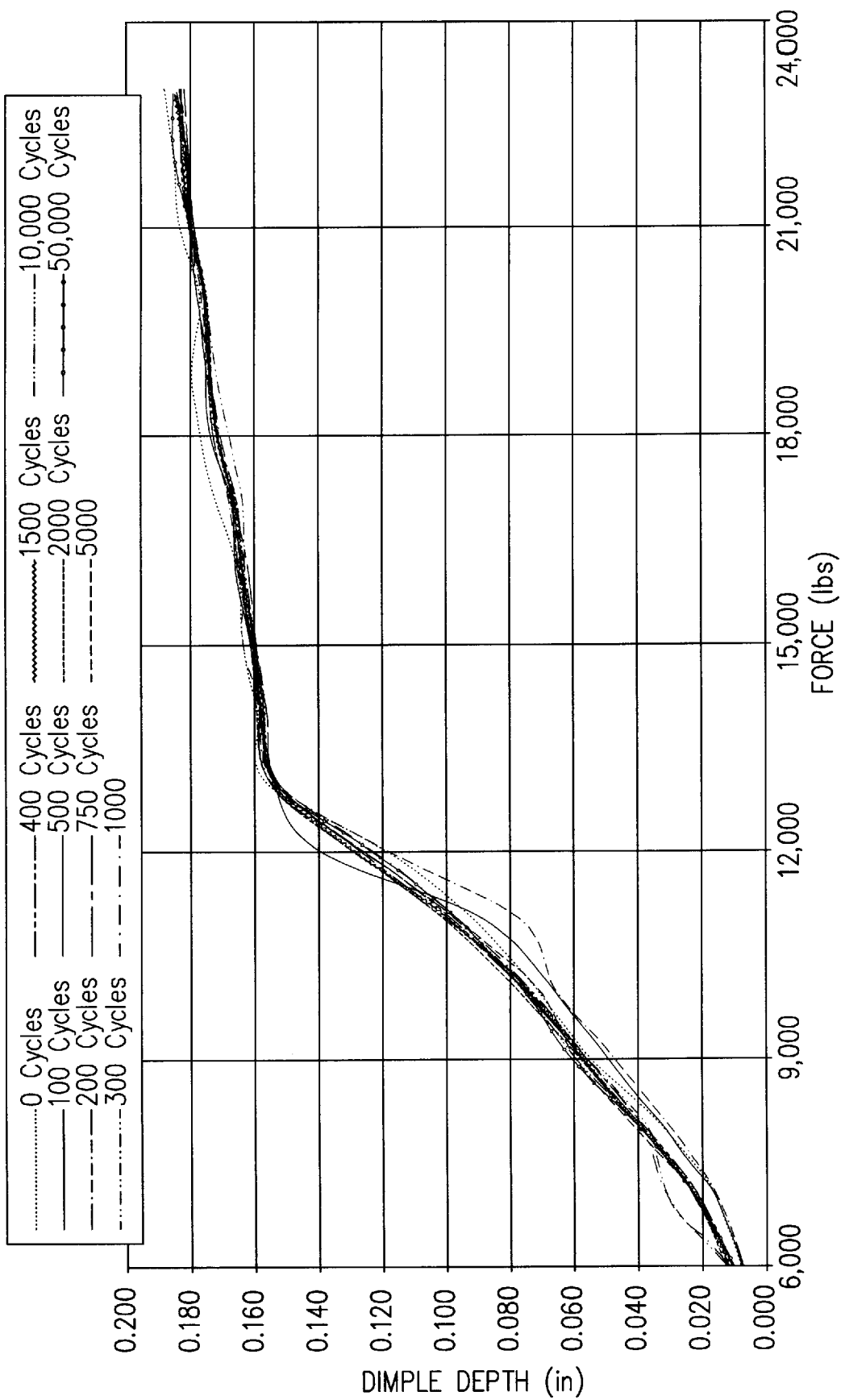
FIG. 6 is a graph showing several instances of dimple depth versus force applied to the passive-adaptive indentor of FIG. 3 after varying urethane durability cycles.
Figure 7:
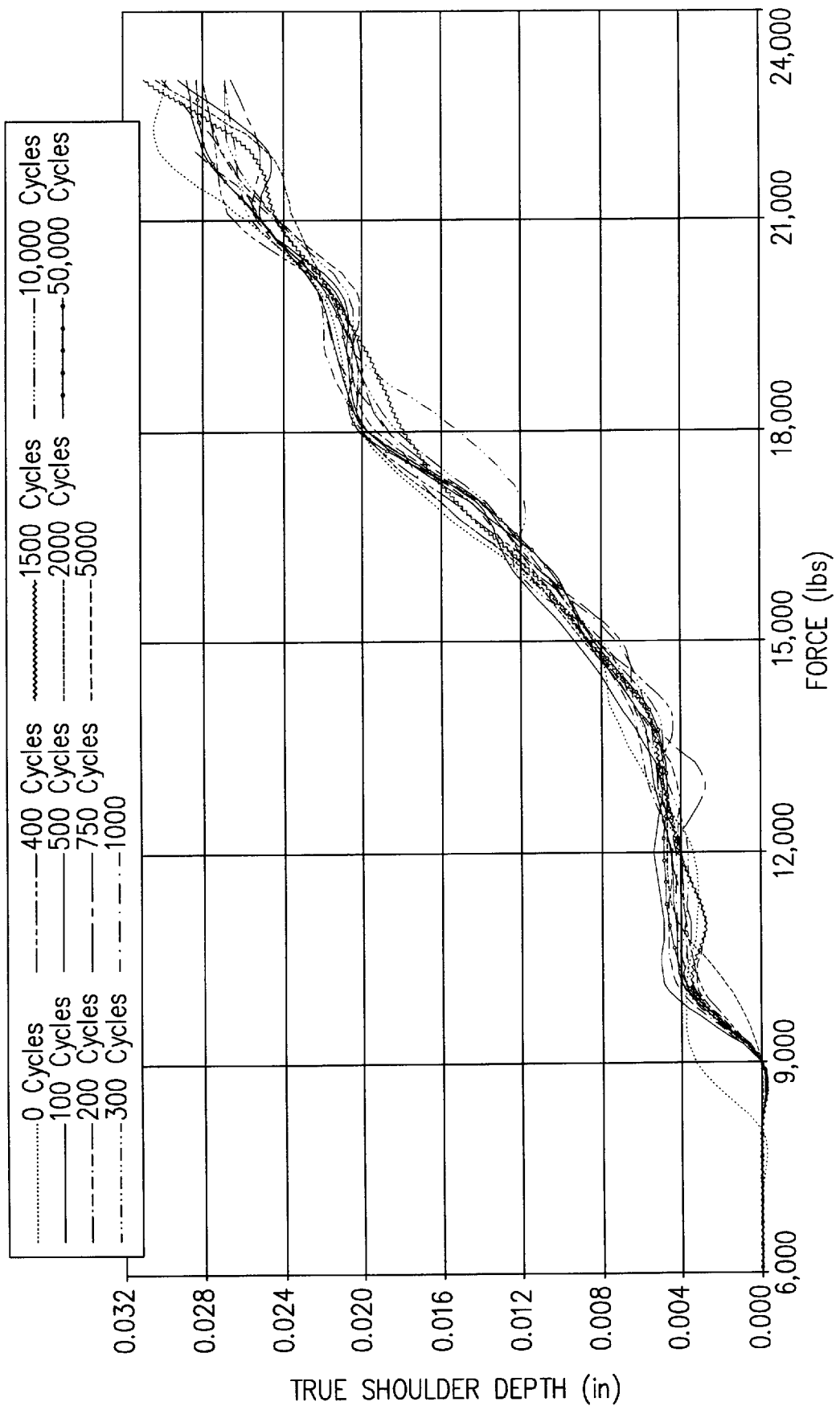
FIG. 7 is a graph showing several instances of true shoulder height versus force applied to the passive-adaptive indentor of FIG. 3 after varying urethane durability cycles.

FIG. 6 is a graph depicting the dimple depth versus force applied to an apparatus in accordance with the present embodiment shown in FIG. 4 using a urethane spring material having a thickness of 0.75 inch as described above. As can be seen from this graph, a generally linear relationship exists between dimple depth and force applied from about 6,000 pounds of force to about 13,000 pounds of force. FIG. 7 is a graph showing the true shoulder depth versus force applied and illustrating that, in the range of between 6,000 pounds of force and 13,000 pounds of force very little shoulder depth occurs as compared with the dimple depth shown in FIG. 6 for the same range.

Figure 8:
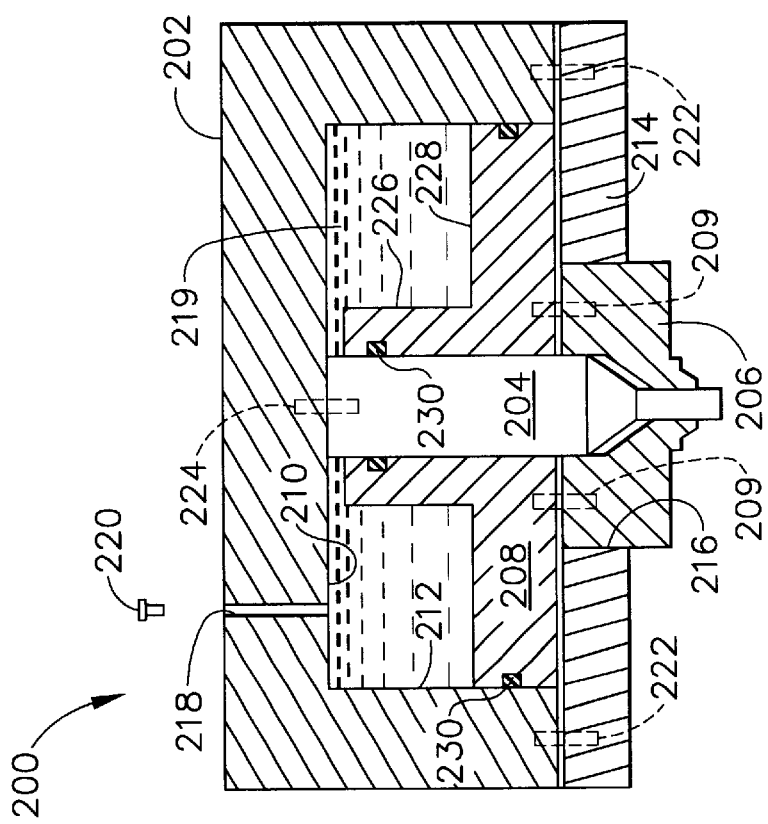
FIG. 8 is a cross-sectional view of another embodiment of a passive-adaptive indentor that utilizes a compressible fluid in accordance with the present invention.

Referring now to FIG. 8, another embodiment of a passive-adaptive indentor in accordance with the present invention is shown generally at 200. Similar to the passive-adaptive indentor 100, the passive-adaptive indentor 200 may comprise a housing 202, a first member or shaft 204 and a second member or tubular structure 206. However, in addition to the foregoing, the passive-adaptive indentor 200 may further comprise a piston 208 that may be connected to the tubular structure 206 via, e.g., fasteners 209.

The housing 202 may be composed of a hardened steel and comprises an inner surface 210 that defines a cavity 212, a closure member 214 that comprises an opening 216 and an access bore 218. Rather than a solid spring material as described above a compressible fluid 219, such as air, may be filled through the access bore 218 and into the cavity 212 for providing a resilient cushion for the tubular structure 206. A fill screw 220 may be provided for closing the access bore 218. A return spring (not shown) such as a coil spring may also be disposed within the cavity 212 for urging the piston 208 adjacent the closure member 214. The closure member 214 may be mounted to the housing 202 via any suitable means including, e.g., fasteners 222.

The shaft 204 may be affixed to the housing via a fastener 224 and may function similar to the shaft 120 described above with respect to the passive-adaptive indentor 100. Therefore, reference may be had to the above description for further details. The tubular structure 206 may be mounted co-axially and in sliding engagement with the shaft 204 and may function similar to the tubular structure 122. Excepting that in this embodiment, the tubular structure 206 is connected to piston 208 that comprises a collar 226 and a radially extending portion 228. The piston 208 may also slide along the shaft 204 and comprises seals 230 for sealing the compressible fluid within the cavity 212.

The operation of the passive-adaptive indentor 200 is similar to that described above with respect to the passive-adaptive indentor 100, although, in the present embodiment, the compressible fluid 219 may cushion movement of the tubular structure 206 thereby providing a reduced force by the tubular structure 206 as compared with that of the shaft 204.

Figure 9:
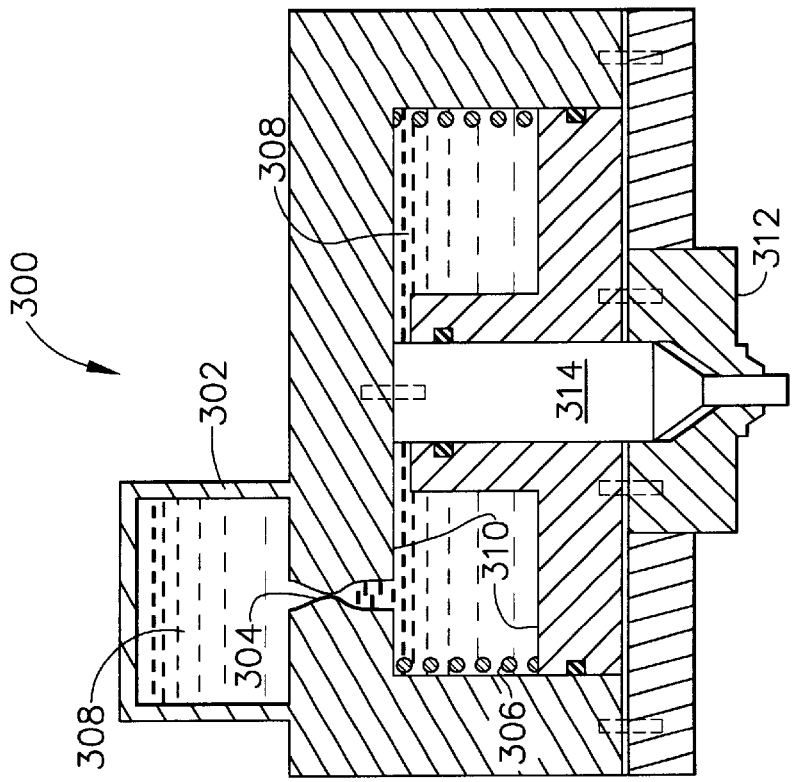
FIG. 9 is a cross-sectional view of a further embodiment of a passive-adaptive indentor that utilizes an incompressible fluid and escape orifice in accordance with the present invention.

A further embodiment of an passive-adaptive indentor in accordance with the present invention is illustrated generally at 300 in FIG. 9. The passive-adaptive indentor 300 may be similar to the passive-adaptive indentor 200 described above, although, the passive-adaptive indentor 300 may further comprise a fluid reservoir 302, an orifice 304 and a return spring 306. The fluid reservoir 302 may function to provide a reservoir for the flow of an incompressible fluid 308, such as a hydraulic fluid, out of a cavity 310 during compression thereof. The orifice 304 may be provided to regulate that flow and thereby provide a particular back-pressure of incompressible fluid 308 within the cavity 310. The spring material 306 may be composed of an elastomer or other suitable material as described above in connection with the spring material 124.

In operation, the passive-adaptive indentor 300 may function similar to that described above with respect to the passive-adaptive indentor 200 excepting that the back pressure of incompressible fluid 308 and spring material 306 combine to reduce the net force applied to the tubular structure 312 as compared to that of the shaft 314.

In still a further embodiment of the present invention, a method of cold working a material using a passive-adaptive indentor such as described above to create plural stress fields in the material is provided. The method may comprise the steps of providing a material having multiple locations to be cold worked. Thereafter, identifying a first location and a particular depth of interest to which a first stress field is to extend at the first location. Next, identifying a particular force to apply to a passive-adaptive indentor depending upon the particular depth of interest. Thereafter, applying the particular force to the first passive-adaptive indentor to simultaneously create a first residual stress field that extends to the particular depth of interest and a second residual stress field that extends to a generally fixed depth of the material regardless of the depth to which the first residual stress field extends. Finally, moving the passive-adaptive indentor to another location.

The method may also comprise the step of locating a second passive adaptive indentor on an opposing side of the material from the first passive adaptive indentor. Thereafter, applying the particular force to the second passive-adaptive indentor to simultaneously create a third residual stress field that extends to the particular depth of interest and a fourth residual stress field that extends to a generally fixed depth of the material regardless of the depth to which the third residual stress field extends.

It should be understood, of course, that the foregoing relates to preferred embodiments of the invention and that modifications may be made without departing from the spirit and scope of the invention as set forth in the following claims.

We claim:

1. A passive-adaptive indentor for cold working a material, the material including a material surface which comprises an aerospace structure having at least one planar material including a planar material surface and a planar material faying surface, a support member having a support member faying surface and a joint located at a contact portion of the material faying surface and the support member faying surface, the material further having a depth extending in a direction that is perpendicular to a direction of the material surface, comprising:

a first member comprising a shaft terminating in a first working end which terminates in an end surface and being configured to create a first residual stress field that extends at least to a depth of the joint, a second member disposed in slidable relationship with the first member, the second member comprises a tubular structure terminating in the second working end and being configured to create a second residual stress field that extends to a depth that is substantially less than that of the first residual stress field and substantially adjacent the planar material surface, a housing comprising a cavity defined by an inner surface, the housing being in fixed relationship with the shaft, a spring material disposed within the cavity, the spring material being interposed between the inner surface of the housing and the tubular structure; and wherein the second member comprises a shoulder surface and wherein the tubular structure is dimensioned and configured to be in a co-axial relationship with the shaft and be movable along an axial direction of the shaft.

2. The passive-adaptive indentor of claim 1 wherein the housing comprises a support mount and an opening and wherein the shaft is fixed to the inner surface of the cavity and the shaft and the tubular structure extend through the opening.

3. The passive-adaptive indentor of claim 1 wherein the tubular structure comprises a collar and a radially extending portion and wherein the spring material is disposed between the inner surface of the cavity and a surface of the radially extending portion.

4. The passive-adaptive indentor of claim 3 wherein the spring material comprises a polymer.

5. The passive-adaptive indentor of claim 3 wherein the spring material is capable of undergoing elastic deformation that is within the range of between about 0% and about 15%.

6. The passive-adaptive indentor of claim 3 wherein the spring material is capable of undergoing about 15% elastic deformation.

7. The passive-adaptive indentor of claim 3 wherein the spring material comprises an elastomer.

8. The passive-adaptive indentor of claim 3 wherein the spring material comprises a compressible fluid.

9. The passive-adaptive indentor of claim 3 wherein the housing comprises a fluid reservoir and a fill bore which comprises a reduced diametrical portion.

10. The passive-adaptive indentor of claim 9 further comprising an incompressible fluid.

11. The passive-adaptive indentor of claim 1, further comprising:

a piston being movably disposed within the cavity and being interconnected for movement with the structure and wherein the piston is disposed between the spring material and the tubular structure.

12. The passive-adaptive indentor of claim 11 wherein the piston comprises a collar having a central bore and a radially extending portion and wherein the spring material is disposed between the inner surface of the cavity and a surface of the radially extending portion.

13. A passive-adaptive indentor for cold working a material, the material including a material surface and a depth extending in a direction that is perpendicular to a direction of the material surface, comprising:

a first member comprising a shaft terminating in a first working end which comprises an end surface and being configured to create a first residual stress field that extends to a predetermined depth in the material, the first member being subjected to a first force whereby the first working end strikes the material surface at a force sufficient to create the first residual stress field, a second member comprising a tubular structure being disposed in slidable relationship with the first member and comprising a second working end, the second working end comprising a shoulder and the second member being configured to create a second residual stress field that extends to a generally fixed second depth of the material regardless of the depth at which the first residual stress field extends, the second member being subjected to a second force whereby the second working end strikes the material surface at a force sufficient to create the second residual stress field, wherein the tubular structure comprises a collar and a radially extending portion and is dimensioned and configured to be in a co-axial relationship with the shaft and be movable along an axial direction of the shaft, a housing having a cavity defined by an inner surface and an opening, the housing being in fixed relationship with the shaft which extends within the cavity and through the opening, the tubular structure also extending through the opening; and a compressible spring material disposed within the cavity, the compressible spring material being interposed between the inner surface of the cavity and a surface of the radially extending portion of the tubular structure.

14. The passive-adaptive indentor of claim 13 wherein the compressible spring material comprises an elastomer disposed within the cavity of the housing.

15. The passive-adaptive indentor of claim 13 wherein the compressible spring material is capable of undergoing elastic deformation that is within the range of between about 0% and about 15%.

16. The passive-adaptive indentor of claim 13 wherein the compressible spring material is capable of undergoing about 15% elastic deformation.

17. The passive-adaptive indentor of claim 13 wherein the compressible spring material comprises an elastomer.

18. The passive-adaptive indentor of claim 13 wherein the piston comprises a collar having a central bore and a radially extending portion and wherein the compressible spring material is disposed between an inner surface of the cavity and a surface of the radially extending portion.

19. A passive-adaptive indentor for cold working a material, the material comprising an aerospace structure having a planar material including a planar material faying surface, a support member having a support member faying surface and a joint located at a contact portion of the planar material faying surface and the support member faying surface, the planar material including a planar material surface and a depth extending in a direction that is perpendicular to a direction of the planar material surface, comprising:

a first member being configured to create a first residual stress field in the material that extends to the joint, the first member being subjected to a first force whereby the first working end strikes the planar material surface at a force sufficient to create the first residual stress field and the first member comprising a shaft terminating in a first working end which comprises an end surface;

a second member being subjected to a second force whereby the second working end strikes the planar material surface at a force sufficient to create a second residual stress field that extends to a depth that is substantially less than that of the first residual stress field and wherein the second member comprises a tubular structure which terminates in a second working end that comprises a shoulder surface and wherein the tubular structure is dimensioned and configured to be in a co-axial relationship with the shaft and be movable along an axial direction of the shaft, the tubular structure also comprising a collar and a radially extending portion;

a housing having a cavity defined by an inner surface and an opening, the housing being in fixed relationship with the shaft which extends within the cavity and through the opening, the tubular structure also extending through the opening; and a compressible spring material comprising an elastomer being disposed between the inner surface of the cavity and a surface of the radially extending portion of the tubular structure.

20. A method of cold working a material using a passive-adaptive indentor to create plural stress fields in the material and that is capable of varying a depth at which a first stress field is to extend while a second stress field extends to a generally fixed depth in the material, the material including a material surface, a depth extending in a direction that is perpendicular to a direction of the material surface, the method comprising the steps of:

providing a material having multiple locations to be cold worked;

identifying a first location and a particular depth of interest to which a first stress field is to extend at the first location;

identifying a single force to apply to a first passive-adaptive indentor depending upon the particular depth of interest;

applying the single force to the first passive-adaptive indentor to simultaneously create at the first location a first residual stress field that extends to the particular depth of interest and a second residual stress field that extends to a generally fixed depth of the material regardless of the depth to which the first residual stress field extends; and moving the passive-adaptive indentor to another location.

21. The method of claim 20 wherein:

the material comprises an aerospace structure having a planar material including a planar material faying surface, a support material having a support material faying surface and a joint located at the contact portion of the planar material faying surface and the support material faying surface; and the first residual stress field created extends to the depth of the joint and the second residual stress field is created at about the material surface.

22. The method of claim 20 further comprising the steps of:
  locating a second passive adaptive indentor on an opposing side of the material from the first passive adaptive indentor; and
  applying a second singular force to the second passive-adaptive indentor to simultaneously create a third residual stress field that extends to the particular depth of interest and a fourth residual stress field that extends to a generally fixed depth of the material regardless of the depth to which the third residual stress field extends.

23. A passive-adaptive indentor for cold working a material, the material including a material surface and a depth extending in a direction that is perpendicular to a direction of the material surface, comprising:
  a shaft extending from a first end to an end surface,
  a tubular structure disposed co-axially around the shaft, the tubular structure extending from a first distal end to an output end,
  a housing slidably disposed co-axially to the tubular structure, wherein the housing is affixed to the shaft,
  a spring material disposed in a cavity, the spring material being configured to exert a force between the tubular structure and the housing, and;
  wherein the end surface is configured to produce a first residual stress in the material that is proportional to a load applied to the housing and the output end is configured to produce a second residual stress in the material that is proportional to the force exerted by the spring material.

24. The passive-adaptive indentor of claim 23 wherein the spring material comprises an elastomer disposed within the cavity of the housing.

25. The passive-adaptive indentor of claim 23 wherein the spring material is capable of undergoing elastic deformation that is within the range of between about 0% and about 15%.

26. The passive-adaptive indentor of claim 23 wherein the spring material is capable of undergoing about 15% elastic deformation.

27. The passive-adaptive indentor of claim 23 wherein the spring material comprises one selected from the group consisting of an elastomer, a compression spring, a pressurized gas, a belleville spring, a stack of belleville springs, and a die spring.

28. The passive-adaptive indentor of claim 23 wherein the tubular structure comprises a collar having a central bore and a radially extending portion and wherein the spring material is disposed between an inner surface of the cavity and a surface of the radially extending portion.

29. The passive-adaptive indentor of claim 23 wherein the spring material comprises a compressible fluid.

30. The passive-adaptive indentor of claim 23 wherein the depth of the first residual stress and the second residual stress can be modified without mechanical adjustment of the passive-adaptive indentor.

31. The passive-adaptive indentor of claim 23 wherein the first residual stress and the second residual stress is modified by modification of a single force applied to the housing.

* * * * *